July 28, 1936.  W. I. FERRIER  2,048,856
TEETH SEPARATOR
Filed Nov. 6, 1933   3 Sheets-Sheet 1
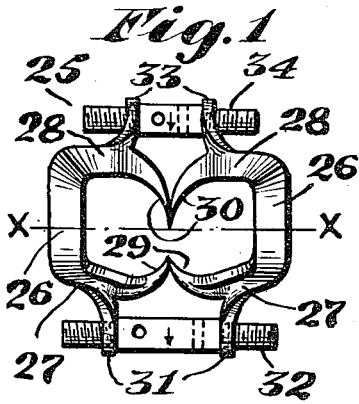
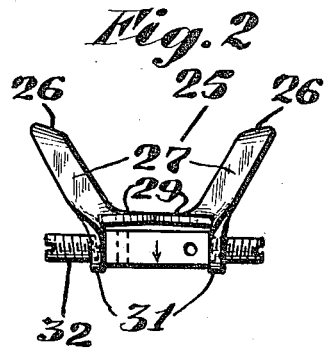
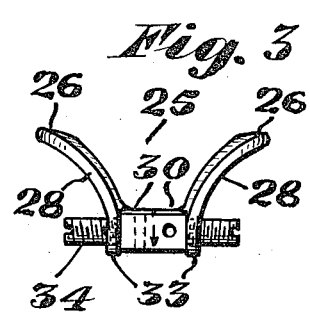
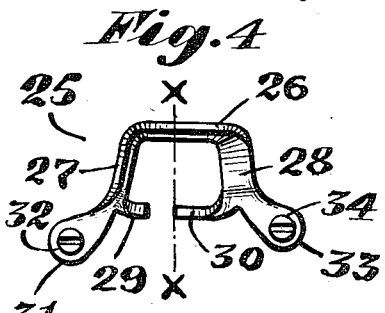
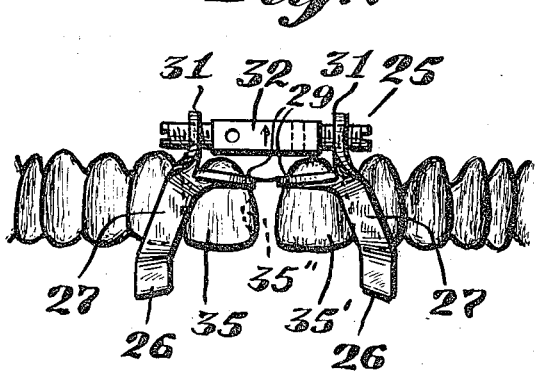
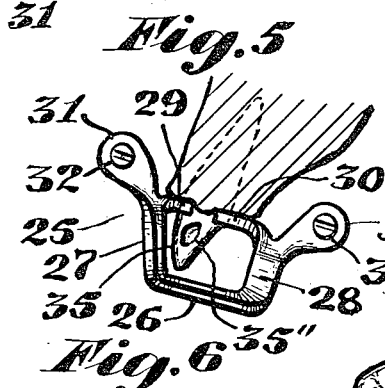
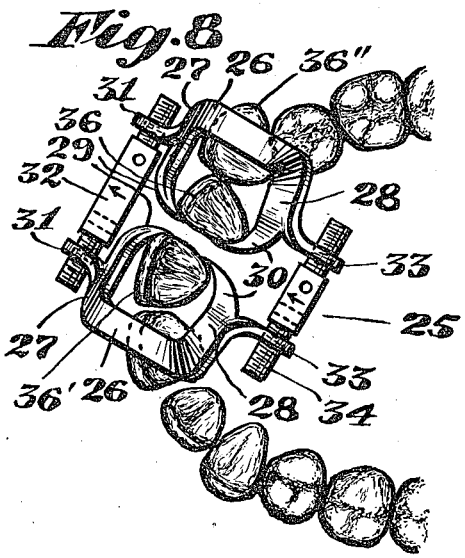
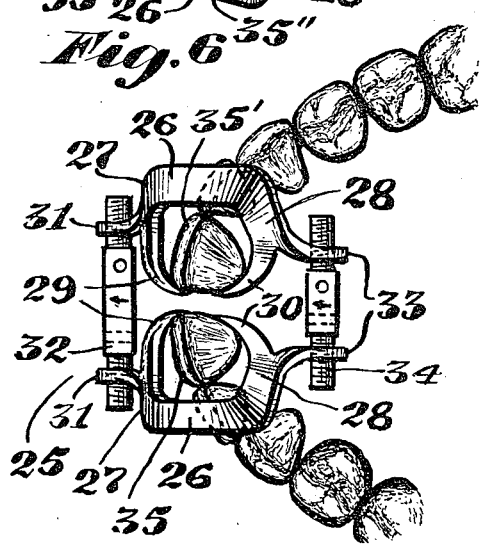
INVENTOR
Walden I. Ferrier
BY James E. Sproule
ATTORNEY

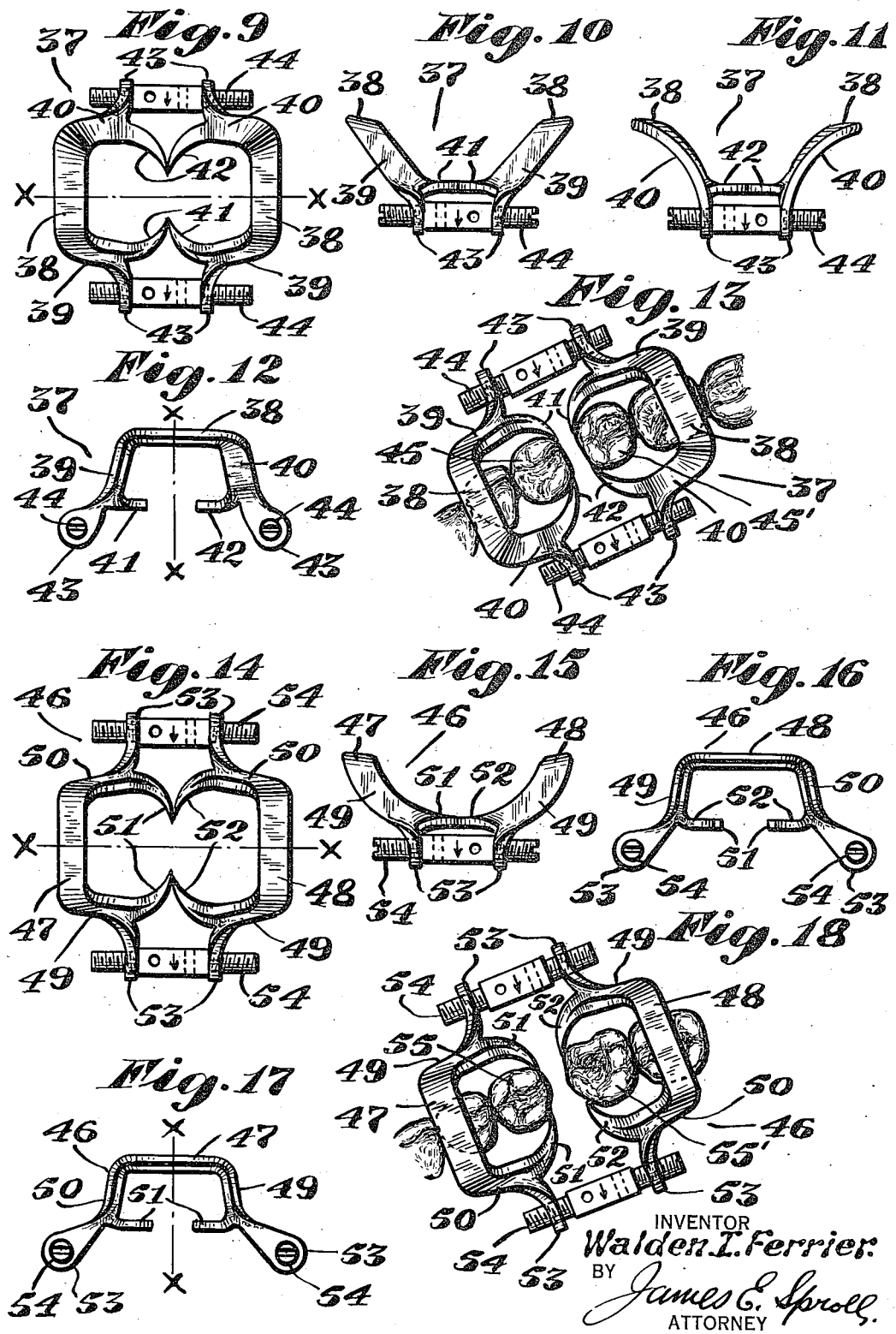

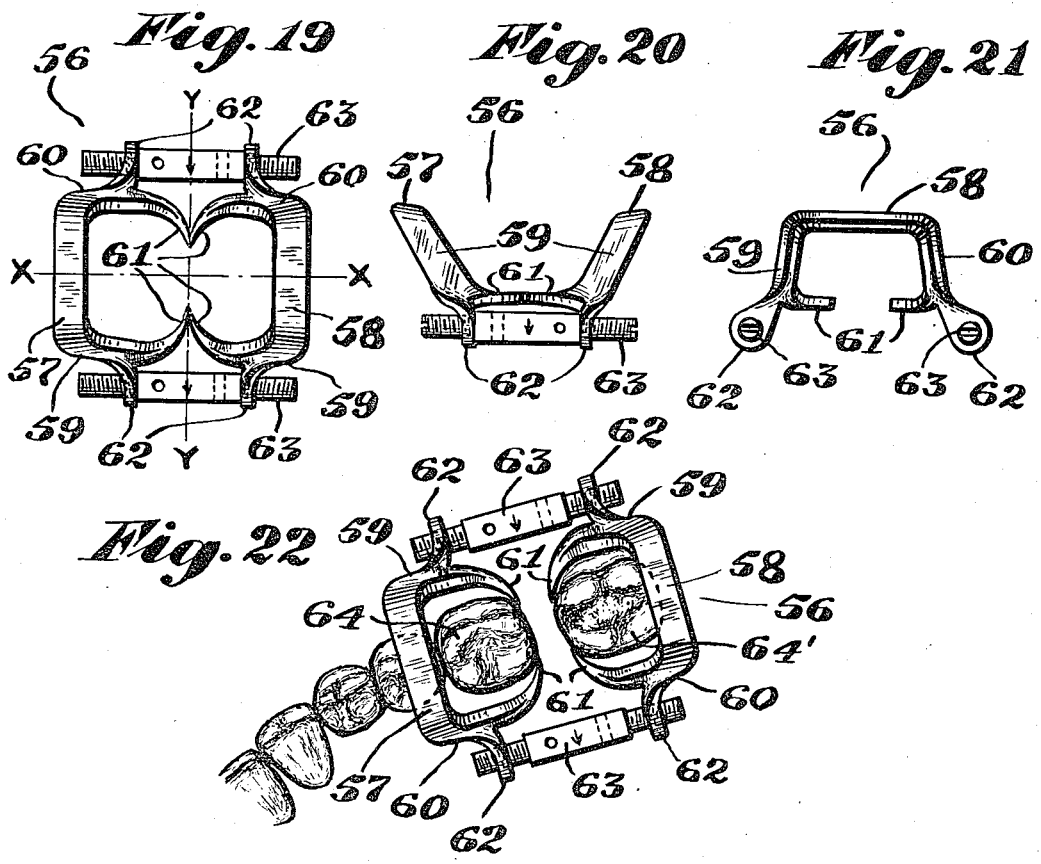

Patented July 28, 1936

2,048,856

UNITED STATES PATENT OFFICE 2,048,856

TEETH SEPARATOR

Walden I. Ferrier, Seattle, Wash.

Application November 6, 1933, Serial No. 696,775

1 Claim. (Cl. 32—64)

This invention relates to improvements in teeth-separators and more particularly to the type of teeth-separators shown in the United States patent, No. 366,025 issued July 5, 1887 to Safford G. Perry, of New York, N. Y., which type of separators are employed by dentists for forcing apart or increasing the space between proximal teeth and for keeping the latter separated during treatment or operation thereon.

The "Perry" type of teeth-separators as heretofore constructed are lacking in various features and particulars of convenience and efficiency, which it is the primary aim and fundamental object of the present invention to provide. Thus the labial or buccal legs or shanks of the bows of the Perry separators occupied too much space on the labial or buccal surfaces of the teeth. The formation or shape of the bows of such separators, more especially the teeth straddling portions of the same, did not provide sufficient operative clearance. The lingual lugs or ears and correlated adjusting bars or screws of such separators interfered with the palates in cases where the latter were flattened or distorted due to protruding teeth, and also interfered with proximal teeth in cases where the same were malposed, and in general such separators were more or less inefficient and were not generally applicable in cases of both normal and malposed teeth.

Contemplated, therefore, by the present invention is a novel and improved teeth-separator especially designed and adapted for general applicability in all cases of both normal and malposed teeth; which occupies or requires only the minimum space on the labial or buccal surfaces of the teeth; which has its teeth straddling portions formed, so as to provide the maximum operative clearance; which has its lingual lugs or ears and their correlated threaded adjusting bar arranged or disposed, so as to assure ample clearance between the same and flattened or distorted palates, and to also assure of similar clearance between the same and malposed proximal teeth; which is flexible in construction to permit its teeth engaging jaws or claws to find their own seats on uneven or varying surfaces of proximal teeth during the separating of the latter; and which in its present and preferred embodiment is broadly characterized by the employment of two oppositely-disposed bows adapted to straddle the teeth having their teeth straddling portions substantially square in form and angularly disposed in outwardly flaring relation to each other, said bows at their labial ends being provided with flattened legs or shanks having their flat inner faces normally disposed in close proximity and in a plane substantially parallel to the surfaces of the teeth being separated, teeth engaging jaws or claws on said bows, elongated and interiorly threaded terminal lugs or ears formed in lateral flaring relation upon the ends of each of said bows and extending below or beyond the bearing points of said jaws, and threaded adjusting bars engageable in the interiorly threaded lugs of the adjacent or common ends of said bows for operating the latter, said threaded bars being preferably slightly smaller in diameter than said interiorly threaded lugs whereby a slight play or flexibility is provided therebetween for permitting said teeth engaging jaws to find their own seats on uneven or varying surfaces of the proximal teeth being separated, all of which features of construction are to be correlated in the broad aim of enhancing the efficiency of the present teeth-separator for general use and application.

The above, and additional objects which will hereinafter be more specifically treated are attained by such means as are shown in the accompanying drawings, described in the following specification and then more clearly pointed out in the claim, which is appended hereto and forms part of this specification.

With reference to the drawings, in which there are illustrated several embodiments of the invention, and throughout the several views of which like characters of reference designate similar parts:—

Figure 1 is a plan view of a teeth-separator comprehended by the present invention and of the type generally known to the dental profession as a "D", "E" or "F" teeth-separator.

Fig. 2 is an elevation of the labial or front side of same.

Fig. 3 is an elevation of the lingual or rear side thereof.

Fig. 4 is an end elevation of the same.

Fig. 5 is a similar view of the same, as it would appear when applied to proximal front teeth of the upper jaw for the purpose of separating the same.

Fig. 6 is an inverted plan view of the same.

Fig. 7 is a front elevation thereof.

Fig. 8 is an inverted plan view of the separator as also applied to proximal front teeth of the upper jaw, certain of the teeth of said upper jaw being malposed.

Fig. 9 is a plan view of a separator of the type generally known to the dental profession as a "C" separator.

Fig. 10 is an elevation of the labial or front side of the same.

Fig. 11 is an elevation of the lingual or rear side thereof.

Fig. 12 is an end elevation of the same.

Fig. 13 is an inverted plan view of the "C" separator, as it would appear when applied to the bicuspid teeth of the upper jaw.

Fig. 14 is a plan view of a separator of the type generally known to the dental profession as a "B" separator.

Fig. 15 is a side elevation of the same.

Fig. 16 is an elevation of the distal or rear end thereof.

Fig. 17 is an elevation of the mesial or front end of same.

Fig. 18 is an inverted plan view of the "B" separator, as it would appear when used upon and separating the second bicuspid and first molar teeth of the upper jaw.

Fig. 19 is a plan view of a separator of the type generally known in the dental profession as an "A" separator.

Fig. 20 is a side elevation of the same.

Fig. 21 is an end elevation thereof, and

Fig. 22 is a plan view of the "A" separator, as it would appear when used upon and separating the molar teeth of the lower jaw.

Before taking up a more detailed description of the drawings and a general exposition of the specific purposes, functions and advantages of the teeth-separators evolved by the present invention, it may be well to state, that a series of such separators, each of slightly different form, constitute a set, as for example, it has been found in dental practice, that a set of six separators are ample and sufficient to care for all teeth, each of which separators are generally designated and commonly known in the dental profession by either a letter or number. When letters are employed the separators are designated from the smallest to the largest in the following order:— "D", "E", "F", "C", "B" and "A", and when numbers are employed these separators are numbered from "one to six (1 to 6)", inclusive. The "D" separator is especially designed and adapted for use upon the front teeth, either when same are in regular alignment or are malposed. The "E" separator is also used upon the front teeth, but generally only when same are in regular alignment. The "F" separator is generally used between the cuspid and first bicuspid teeth. The "C" separator is generally used between the bicuspid teeth. The "B" separator is generally used between the second bicuspid and first molar teeth. The "A" separator is generally used between the molar teeth. In the present disclosure I have elected to show and describe the "D", "C", "B" and "A" separators, inasmuch as, the "D", "E" and "F" separators are substantially identical in construction and only vary slightly in minor structural details, as for example, the relative lengths of their teeth engaging jaws and very slight variations in their heights and widths.

Beginning now the more detailed description of the invention by reference to the accompanying drawings, and referring here more particularly to Figs. 1 to 8, inclusive, the numeral 25 generally designates a "D" separator provided with complemental oppositely-disposed bows 26, preferably fabricated from relatively thin spring steel, or like material, said bows being adapted and shaped to straddle or pass over the teeth, and in order to provide greater operative clearance and more general application of the separator in both normal and abnormal cases than was possible with former separators, the teeth straddling portions of said bows, in the present instance, are preferably square in form and angularly disposed in outwardly flaring relation to each other, substantially in the manner shown in Figs. 1 and 4.

In fabricating the bows 26, the labial legs or front sides 27 of same are substantially flattened, as shown in Figs. 1, 2 and 4, so that, when the separator is applied to proximal teeth for effecting separation of the same, the flat inner faces of said labial legs 27 are normally disposed in close proximity and in a plane substantially parallel to the labial surfaces of said teeth, this in order to provide more operative clearance and less interference, than was obtainable in the teeth-separators heretofore in use, by reason of the fact, that labial legs flattened in the manner herein shown and described occupy or require much less space labially, than legs otherwise formed. Further, by referring more particularly to Figs. 1 and 4, it will be noted and observed, that the labial legs 27 have a slight outward flare both lengthwise and laterally relative to the major axis X—X of the separator, this in order to further increase operative clearance and decrease interference of the latter.

The numeral 28 designates the lingual legs or rear sides of the bows 26 which, in the present instance are also flat, but, are bent or formed, so that the same are normally disposed in edgewise relation to the lingual surfaces of the proximal teeth being separated, see Figs. 6 and 8, said legs also having a slight outward flare lengthwise relative to the major axis X—X of the separator, see Fig. 4. The principal reason for forming the lingual legs 28 in the manner just described, is that, the "D" separator is generally used upon the frontal teeth, more specifically, the teeth anterior to or forward of the bicuspid teeth, and inasmuch, as such frontal teeth normally and substantially form an arc of a circle, there is in consequence much less room or space on the lingual side of said arc, hence, were the lingual legs 28 flattened in the manner hereinbefore described for the labial legs 27, said lingual legs 28 would interfere materially with the application of the separator to said frontal teeth, principally because lingual legs, thus flattened would interfere and contact with the teeth adjacent the proximal teeth being separated.

The numeral 29 designates relatively short inwardly curving teeth engaging jaws or claws formed upon the lower portions of the labial legs 27, while the numeral 30 designates slightly longer inwardly curving teeth engaging jaws or claws formed upon the lower portions of the lingual legs 28, it being here noted and observed that the bearing points or tips of the jaws 29 are spaced from the major axis X—X of the separator, while, the bearing points or tips of the jaws 30 extend to said major axis. The jaws 29 and 30 are of the general shape shown, and are bent inwardly and slightly downwardly from their respective legs, so that their bearing points take hold upon the necks of the teeth at or near the gums. It will be manifest, however, that the jaws 30 of the lingual legs 28 may terminate short of the major axis X—X if desired, this in order to conform to different teeth, the important and essential feature to be observed in a separator to be used on frontal teeth is that the bearing points of the jaws 30 must of necessity be always closer to the major axis X—X, than the bearing points of the jaws 29, so that the legs 27 are at all times close to the teeth, see Fig. 5.

The labial legs 27 upon their inner ends are provided with elongated terminal lugs or ears 31, which latter extend, in outward flaring relation to the major axis X—X of the separator, below or beyond the bearing points of the jaws 29, that is, beyond such jaws toward or below the line of the gums, and are provided with tapped holes adapted to receive a threaded adjusting bar or stem 32, which latter is cut upon its opposite ends with right and left hand screw-threads for engagement in said tapped holes which are similarly threaded. The central portion of the bar 32 is squared, so that a wrench may be applied thereto to turn the same, and such central portion is also provided with holes so that a pointed tool may be used for the same purpose, further the bar 32 is also slotted at its ends so that a screw-driver may be employed if desired to turn the same.

The lingual legs 28 upon their inner ends are provided with elongated terminal lugs 33, which extend, in outward flaring relation to the major axis X—X of the separator, below or beyond the bearing points of their correlated jaws 30 a slightly lesser amount, than do the lugs 31 relative to their correlated jaws 29, said lugs 33 being provided with tapped holes adapted to receive a threaded adjusting bar or stem 34 which is slightly shorter than the bar 32 and is provided at its opposite ends with right and left hand screw threads for engagement in said tapped holes, which are similarly threaded. The bar 34 is provided with a squared portion having holes therethrough and is slotted at its ends, so that the same may be turned or manipulated by a wrench, pointed tool or screw-driver, said squared portion of the bar 34, in the present instance, being slightly shorter than the corresponding portion of the bar 32.

The threaded adjusting bars 32 and 34 are preferably made slightly smaller than their tapped holes in the lugs 31 and 33, this in order, to provide a certain amount of play or flexibility between the bows 26, so that, the teeth engaging jaws 29 and 30 of the latter will find their own seats on uneven or varying surfaces of the proximal teeth being separated, and thus relieve the separator of undue or unnecessary strain at any point thereon or portion thereof, where heretofore such threads were cut the same size as their tapped holes resulting in many instances in the stripping of the threads and/or breakage of the teeth engaging jaws or claws of the separator.

As herein shown and described, the terminal lugs 33 are formed in lateral flaring relation upon the lingual ends of their bows 26, also such lugs 33 do not extend as far below or beyond the bearing points of their correlated jaws 30, as do the labial lugs 31 of said bows relative to the bearing points of their correlated jaws 29, further, the lingual adjusting bar 34 is somewhat shorter than the labial adjusting bar 32, all of which is for the purpose of providing ample clearance between the palate, whether normal or flattened, and the lugs 33 and their adjusting bar 34, and in addition thereto facilitating adjustment of the bar 34, when the separator is being operatively positioned within the mouth. It will therefore, be obvious and apparent, that a teeth-separator is provided, which is more readily adaptable for use in cases of flattened or distorted palates and in cases of malposed teeth. Further, fabricating of the terminal lugs 33 and the adjusting bar 34, in the manner above described, also provides ample clearance between said lugs and bar and the tissue on the lingual side of the lower jaw, when the separator is applied to the frontal teeth of the latter.

In Figs. 5 to 7, inclusive, I have shown the "D" separator 25 as applied to and separating adjacent or proximal front teeth 35 and 35' of the upper jaw, whereby ready access is had to a cavity, as 35", in the proximal surface of one of said teeth, see Fig. 5.

In Fig. 8 I have illustrated the "D" separator 25 as applied to malposed front teeth of the upper jaw, said separator being shown as separating adjacent or proximal teeth 36 and 36', with a badly malposed tooth 36" next to the tooth 36, it being here noted that the adjacent flattened labial leg 27 amply clears such malposed tooth.

Referring now more particularly to Figs. 9 to 13, inclusive, wherein the numeral 37 generally designates a "C" separator comprising complemental oppositely-disposed teeth straddling bows 38, the teeth straddling portions of which are substantially square in form and are angularly disposed in outward flaring relation to each other. The bows 38 are provided with labial or buccal legs 39 and lingual legs 40, which legs are substantially identical in shape to the corresponding legs 27 and 28 of the separator 25 hereinbefore described.

The numeral 41 designates inwardly curving teeth engaging jaws formed upon the lower portions of the labial legs 39, while 42 designates similar jaws formed upon the lower portions of the lingual legs 40, it being here noted that the bearings points or tips of the jaws 41 and 42 are spaced from the major axis X—X of the "C" separator an equal distance.

The legs 39 and 40 are provided with elongated terminal lugs 43, which lugs extend, in lateral flaring relation, below or beyond the bearing points of the jaws 41 and 42, said lugs 43 being provided, in a common plane, with tapped holes adapted to receive threaded adjusting bars 44 of equal length, which bars are cut at opposite ends with right and left hand screw-threads for engagement in said tapped holes which are correspondingly threaded. The bars 44 are provided with squared portions of equal length having holes therethrough, said bars being also slotted at their ends, so that the same may be adjusted or turned by a wrench, pointed tool, or a screw-driver. The threaded portions of the adjusting bars 44 are slightly smaller than their tapped holes for the same reason hereinbefore set forth for the adjusting bars 32 and 34 of the "D" separator.

The principal differences between separators of the "D" and "C" type are that the latter are somewhat larger in construction, their bearing points of their teeth engaging jaws are an equal distance from the major axis X—X of the separator, their adjusting bars are disposed in a common plane and are of equal length, otherwise the "C" type of separator is substantially identical in shape to the "D" type.

In Fig. 13 I have shown the "C" separator 37 as applied to and separating the bicuspid teeth 45 and 45' of the upper jaw, whereby the proximal surfaces of such teeth may be rapidly and readily worked upon and treated.

Referring now more particularly to Figs. 14 to 18, inclusive, wherein the numeral 46 generally designates a "B" separator comprising a mesial bow 47 and a distal bow 48, the teeth straddling portions of which are substantially square in form and are angularly disposed in outward flaring relation to each other, the teeth straddling portions of said distal bow 48, however, being slightly wider than the corresponding portion of the mesial bow 47, this in order to accommodate and straddle the proximal molar teeth. The numeral 49 designates the labial or buccal legs of the mesial and distal bows 47 and 48, and 50 designates the lingual legs thereof, both of which are formed or bent to normally dispose their flat inner faces in close proximity and in a plane substantially parallel to the labial and lingual surfaces of the teeth being separated, this for the reason, that the "B" separator is used between the second bicuspid and the first molar teeth, and as these teeth are substantially in a straight line, it is a distinct advantage to have both the labial and lingual legs 49 and 50 bent or formed in the manner above described, so that such legs are brought closer to the teeth and greater freedom from operative interference is provided.

The labial and lingual legs of the mesial bow 47 are provided adjacent their lower ends with inwardly curving teeth engaging jaws 51, the bearing points or tips of which are an equal distance from the major axis X—X of the separator. Similarly the labial and lingual legs of the distal bow 48 are provided with slightly shorter inwardly curving teeth engaging jaws 52, the bearing points or tips of which are an equal distance from the major axis X—X of the separator, but, are disposed a slightly greater amount therefrom, than are the points or tips of the jaws 51, see Figs. 14 and 16.

The labial and lingual legs of the mesial and distal bows 47 and 48 are provided with elongated terminal lugs 53, which latter extend, in lateral flaring relation, below or beyond the bearing points of the jaws 51 and 52 and are provided, in a common plane, with tapped holes adapted to receive slightly smaller threaded adjusting bars 54, which are identical in construction to the adjusting bars 44 of the "C" separator.

In Fig. 18 I have illustrated the "B" separator as applied to and separating the second bicuspid tooth 55 and first molar tooth 55' of the upper jaw, so that the proximal surfaces of same may be worked upon in an obvious manner.

Referring now more specifically to Figs. 19 to 22, inclusive, wherein the numeral 56 generally designates an "A" separator comprising a mesial bow 57 and a distal bow 58, the teeth straddling portions of which are substantially square in form and are angularly disposed in outward flaring relation to each other, the teeth straddling portion of said distal bow 58 being disposed somewhat closer to the lateral or minor axis Y—Y of the separator than the corresponding portion of the mesial bow, this in order to provide clearance for and prevent impingement of said distal bow upon the soft tissues in proximal relation to and rearwardly of the second molar teeth.

The numeral 59 designates the labial or buccal legs of the mesial and distal bows 57 and 58, and 60 the lingual legs of same, both of which are substantially identical in shape to the corresponding legs 49 and 50 of the "B" separator.

The labial and lingual legs of the mesial and distal bows 57 and 58 are provided adjacent their lower ends with inwardly curving teeth engaging jaws 61, the bearing points or tips of which are at an equal distance from the major axis X—X of the separator and when in contact are in alignment with the minor axis Y—Y thereof, see Figs. 19 and 20.

The numeral 62 designates elongated terminal lugs formed upon the labial and lingual legs of the bows 57 and 58, which lugs extend, in lateral flaring relation, below or beyond the bearing points of the jaws 61 and are provided, in a common plane, with tapped holes adapted to receive slightly smaller threaded adjusting bars 63, which are similar in construction to the adjusting bars 44 and 54, respectively, of the "C" and "B" separators.

In Fig. 22 I have shown the "A" separator as applied to and separating the molar teeth 64 and 64' of the lower jaw for effecting treatment of the proximal surfaces of the same, and by referring to said figure it will be noted and observed that by shortening or disposing the teeth straddling portion of the distal bow 58 closer to the lateral axis Y—Y, such portion will clear and not contact the soft tissues in the rear of the tooth 64'.

In the foregoing description I have stated the bows of the present novel and improved teeth-separator are preferably fabricated from relatively thin spring steel, or like material, this for the reason, that I have found in practice and after extensive experimentation, the teeth are separated with much less pain and inconvenience to the patient due to the resilient nature of such bows functioning to apply the separating force very slowly or gradually and much more evenly, than is possible with bows fabricated from rigid material. One scientific explanation of the mode of operation of my device where the "bows functioning to apply the separating force very slowly or gradually and much more evenly, than is possible with bows fabricated from rigid material" and the reason for the result of "less pain and inconvenience to the patient" obtaining from the use thereof is that my device operates in a manner which takes advantage of the structural supporting nature of teeth. Teeth roots are not directly imbedded in the jaw bone but a compressible layer of material called peridental membrane surrounds the roots and is disposed between the said roots and the said bone. If a resilient pressure is placed against a tooth and the pressure is continued for an appreciable length of time, it will be observed that the tooth gradually moves in accordance with the pressure. This occurs without pain and inconvenience (such terms are of course relative and are used in a comparative sense as respects prior art devices) as the said peridental membrane compresses, permitting the tooth to move in accordance with the resilient pressure. On the other hand, if a relatively non-yielding or non-resilient pressure is applied, the said peridental membrane must immediately compress, resulting in extreme pain or inconvenience to the patient.

The relatively resilient pressure of my separators obtains from structure illustrated and described. Referring to Figs. 1 to 8, inclusive, as the bars 32 and 34 are angularly moved in the proper direction, the bows 26 are separated and the jaws 29 and 30 of the bows engage the teeth of the patient and apply a pressure on adjoining (proximal) teeth of the patient. This pressure tends to separate the jaws 29 and 30 of the bows in a direction which is at right angles to the direction of the line or axis X—X in Figure 1, or substantially through each bow 26 because of the character of the engagement of the jaws 29 and 30 with the teeth of the patient. Pressure in this direction is resisted by the broad or flat upper portions of the bows 26 which are transversed by said line X—X in Figure 1 and tends to place them under tension. In view of the fact that such bows are fabricated from spring steel and that the strain on said bows is in a direction which will be resisted by the flat and springy direction of the bows (as distinguished from the edgewise or relatively non-springy direction of the bows), the pressure created by angularly moving bars 32 and 34 and the tension developed thereby in the bows is resiliently applied to separate the teeth of the patient. Also the relatively square corners which are provided between the labial legs 27 and the closing bar of the U provide another flexible or resilient link or spring means between the pressure applying bars 32 and 34 and the jaws 29 and 30. Likewise the labial legs 27 are disposed in such a plane as to provide to a certain degree further resilient links or spring means between the pressure applying bars 32 and 34 and the jaws 29 and 30.

In the use of my separators, it is desirable that the bars 32 and 34 be angularly moved until the jaws 29 and 30 of the bows provide a yielding pressure tending to separate the teeth of the patient. Then a time interval should preferably elapse to permit the peridental membrane to compress, permitting the teeth to be separated in accordance with the pressure applied. If further separation is desired, then the said bars 32 and 34 may be periodically angularly moved with time intervals between the movements of said bars until the teeth are separated the desired amount. The amount of pressure applied and the possible time interval between periods of applying the same will vary greatly with individual patients and one skilled in the art will soon ascertain the minimum period required to apply the separator without pain to the patient.

Furthermore, the resilient nature of the present bows conjointly with the hereinbefore described flexibility provided between the threaded adjusting bars and their tapped lugs serve and function to cause or effect a more positive and firmer engagement of all the jaws or claws of the separator upon the proximal teeth being separated, than was possible with former types of teeth-separators in general use.

Manifestly, therefore, the separators of the present invention are extremely simple, compact, durable and economical in construction, are efficient and reliable in use, are applicable to all teeth whether normal or malposed, and due to their novel and improved construction occupy less space labially, provide greater operative clearance, are more rapidly and readily positioned upon the teeth to be treated, and when thus positioned do not interfere or contact with the palate or other soft and delicate mouth tissues.

While I have herein shown and described my invention with sufficient detail to enable those skilled in the art to understand the mode of construction and the principles involved, it is to be understood that there is no intentional limitation herein to the specific forms and precise details of construction of the invention shown and described except as expressly defined by the appended claim, and that various modifications of said construction may be resorted to without departing from the spirit of the invention or the benefits derivable therefrom. I also desire to have it understood that certain features of the invention herein shown and described may be employed in other combinations than those herein shown.

Having thus fully described my invention, what I claim as new and desire to secure by Letters Patent is:—

In a teeth separator, the combination of two oppositely disposed bows fabricated of spring material being relatively rectangular in cross section and having substantially U shaped teeth straddling portions, the bar forming the closed end of each U shaped member being positioned with its broader surface in a plane substantially at right angles to a plane passing through the U shaped member, the labial legs and lingual legs of the U shaped member forming a substantially square corner with said bar forming the closed end of the U shaped member, and the broad surface of the labial leg being positioned in a plane which forms approximately a right angle with a plane passing through said U shaped member, whereby each bow is of a spring character tending to yieldingly resist opening of the U shaped member; teeth engaging jaws on the labial and lingual legs of the bows; and threaded adjusting bars engageable with the lower leg portions of said bows moving the teeth engaging jaws of one bow toward and away from the teeth engaging jaws of the other bow, whereby a resilient link is provided between the teeth engaging jaws and the adjustable bars for moving the same.

WALDEN I. FERRIER.